United States Patent
Bae et al.

(10) Patent No.: US 9,691,190 B2
(45) Date of Patent: Jun. 27, 2017

(54) LOCATION BASED PARKING METER TIME REMINDER

(71) Applicant: Faraday & Future Inc., Gardena, CA (US)

(72) Inventors: Hong Bae, Torrance, CA (US); Kenneth X. Xie, Manhattan Beach, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/090,513

(22) Filed: Apr. 4, 2016

(65) Prior Publication Data

US 2017/0154474 A1 Jun. 1, 2017

Related U.S. Application Data

(60) Provisional application No. 62/261,239, filed on Nov. 30, 2015.

(51) Int. Cl.
*B60Q 1/48* (2006.01)
*G07C 1/30* (2006.01)
*G08G 1/14* (2006.01)

(52) U.S. Cl.
CPC ........ *G07C 1/30* (2013.01); *G08G 1/14* (2013.01)

(58) Field of Classification Search
CPC .................................. G07C 1/30; G08G 1/14
USPC ....................................................... 340/932.2
See application file for complete search history.

(56) References Cited

U.S. PATENT DOCUMENTS

| 8,368,522 B1* | 2/2013 | Kralj | B60R 25/10 340/426.18 |
| 2009/0309759 A1* | 12/2009 | Williams | G08G 1/14 340/932.2 |
| 2010/0073201 A1* | 3/2010 | Holcomb | G08G 1/005 340/990 |
| 2011/0224864 A1* | 9/2011 | Gellatly | G01C 21/3679 701/29.5 |
| 2012/0095791 A1* | 4/2012 | Stefik | G06Q 10/02 705/5 |
| 2012/0284146 A1* | 11/2012 | Wong | G07F 17/24 705/26.41 |

(Continued)

OTHER PUBLICATIONS

Auto Pro. "Auto Parking Reminder—Android Apps on Google Play," National Tenders, Transportation, located at: <https://play.google.com/store/apps/details?id=com.dotocto.parkingapptrail&hl=en> retrieved on Mar. 28, 2016, two pages.

(Continued)

*Primary Examiner* — Hai Phan
*Assistant Examiner* — Zhen Y Wu
(74) *Attorney, Agent, or Firm* — Morrison & Foerster LLP

(57) ABSTRACT

In embodiments of the disclosure, location information can be used to automatically set a parking meter time reminder on a user's mobile device. For example, after determining that the user has parked once a destination has been reached, the user's location can be used to determine if the vehicle has been parked at a parking meter (or other timed parking), and a reminder can be set based on a time limit associated with that parking location. The reminder can display periodic notifications on the user's mobile device until it is detected that the user has driven the vehicle away from the parking spot.

22 Claims, 3 Drawing Sheets

(56) References Cited

U.S. PATENT DOCUMENTS

| | | | | |
|---|---|---|---|---|
| 2013/0110822 A1* | 5/2013 | Ikeda | G06F 17/3087 | 707/722 |
| 2013/0191189 A1* | 7/2013 | Aparicio | G07B 15/02 | 705/13 |
| 2013/0257604 A1* | 10/2013 | Mirle | B60R 16/02 | 340/425.5 |
| 2014/0176326 A1* | 6/2014 | Tominaga | B60R 25/2009 | 340/457 |
| 2014/0195153 A1* | 7/2014 | Barrett | G01C 21/34 | 701/516 |
| 2014/0232570 A1* | 8/2014 | Skinder | G01C 21/165 | 340/989 |
| 2014/0288774 A1* | 9/2014 | Morita | G01C 21/26 | 701/36 |
| 2014/0309864 A1* | 10/2014 | Ricci | H04W 48/04 | 701/36 |
| 2014/0350847 A1* | 11/2014 | Ichinokawa | G01C 21/00 | 701/468 |
| 2014/0372185 A1* | 12/2014 | Ganot | G07B 15/02 | 705/13 |
| 2015/0015709 A1* | 1/2015 | Stefan | H04N 7/188 | 348/148 |
| 2015/0029041 A1* | 1/2015 | Liu | G08G 1/143 | 340/932.2 |
| 2015/0379784 A1* | 12/2015 | Gotz | G07C 5/00 | 701/29.1 |
| 2016/0012726 A1* | 1/2016 | Wang | G08G 1/0112 | 340/932.2 |

OTHER PUBLICATIONS

Brustein, J. (Jan. 20, 2012). "Sign Says What? Park at Your Peril," The New York Times, iphone app, located at: <http://www.nytimes.com/2012/01/22/nyregion/iphone-app-tells-if-you-can-park-here-there-and-an>.Retrieved on Mar. 27, 2016, three pages.

ParkDetroit. (2015). "Frequently Asked Questions," Mobile App Overview, located at: <http://www.parkdetroit.us/faq.html>, Retrieved on Mar. 27, 2016, nine pages.

* cited by examiner

LOCATION BASED PARKING METER TIME REMINDER

CROSS-REFERENCE TO RELATED APPLICATION

This application claims the benefit under 35 U.S.C. §119 (e) of U.S. Provisional Patent Application No. 62/261,239, filed Nov. 30, 2015, the content of which is incorporated by reference herein in its entirety for all purposes.

FIELD OF THE DISCLOSURE

This relates generally to a parking time reminder for a vehicle, such as an automobile.

BACKGROUND

Modern vehicles, especially automobiles, increasingly include connected features that allow the vehicle to communicate with other devices, often over the internet. For example, a smartphone can be used to lock and unlock car doors. Further, modern vehicles are often able to determine location in real time and communicate that location to other devices.

SUMMARY

In embodiments of the disclosure, location information can be used to automatically set a parking meter time reminder on a user's mobile device. For example, after determining that the user has parked once a destination has been reached, the user's location can be used to determine if the vehicle has been parked at a parking meter (or other timed parking), and a reminder can be set based on a time limit associated with that parking location. The reminder can display periodic notifications on the user's mobile device until it is detected that the user has driven the vehicle away from the parking spot.

DETAILED DESCRIPTION

In the following description of embodiments, reference is made to the accompanying drawings which form a part hereof, and in which it is shown by way of illustration specific embodiments which can be practiced. It is to be understood that other embodiments can be used and structural changes can be made without departing from the scope of the disclosed embodiments.

Modern vehicles, especially automobiles, increasingly include connected features that allow the vehicle to communicate with other devices, often over the internet. For example, a smartphone can be used to lock and unlock car doors. Further, modern vehicles are often able to determine location in real time and communicate that location to other devices.

In embodiments of the disclosure, location information can be used to automatically set a parking meter time reminder on a user's mobile device. For example, after determining that the user has parked once a destination has been reached, the user's location can be used to determine if the vehicle has been parked at a parking meter (or other timed parking), and a reminder can be set based on a time limit associated with that parking location. The reminder can display periodic notifications on the user's mobile device until it is detected that the user has returned to the vehicle and/or driven the vehicle away from the parking spot.

Although some embodiments of the disclosure are described in terms of determining a time reminder based on location, embodiments are not so limited and determining the time reminder can be based on any number of factors, including direct communication between the electronic device and a parking meter or other device. Although some embodiments of the disclosure are described in terms of a parking meter time reminder, embodiments are not so limited and may include any number of parking notifications, such as a notification that the vehicle is illegally parked or a notification that a vehicle must be moved for street cleaning.

Figure 1:
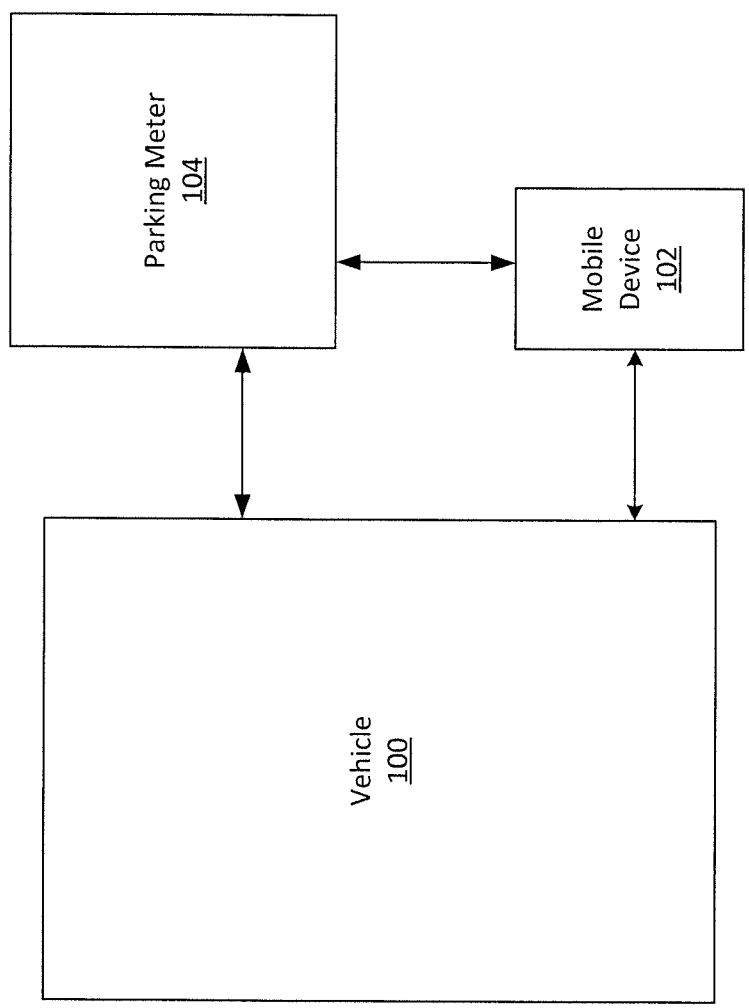
FIG. 1 illustrates an exemplary system for a location based parking meter time reminder according to embodiments of the disclosure.

FIG. 1 illustrates an exemplary system for a location based parking meter time reminder according to embodiments of the disclosure. FIG. 1 includes a vehicle 100 (e.g., an automobile) in communication with a mobile device 102 (e.g., a smartphone belonging to a driver or passenger of the vehicle). In some embodiments, either or both of the vehicle 100 and the mobile device 102 may be in communication with a parking meter 104 (e.g., a parking meter proximate to the vehicle, such as a parking meter associated with a parking space occupied by the vehicle, or a "meter" at a central server that is not proximate to the vehicle).

In some embodiments, once a vehicle 100 arrives at a destination (e.g., with or without guidance from a global positioning system (GPS) navigation system), the vehicle 100 or the mobile device 102 may automatically recognize the location (e.g., street parking, meter parking, parking lot, etc.) based on the GPS location (or other location technology) and digital maps that associate one or more locations with parking time limits corresponding to the locations. The digital maps may be stored locally or remotely and may include parking time limit information associated with the recognized location or region (e.g., a side of a street block, a designated parking space, parking lot of a commercial establishment such as a shopping mall). The parking time limit information can include, for example, a fixed time duration of permitted free parking (e.g., one-hour street parking), non-parking hours (e.g., street cleaning hours), parking meter information (e.g., unit of time increments, maximum time allowed, free hours), and residents parking hours. The parking time limit information can also indicate a parking space without any time/hour restrictions, in which case no notification about the parking time limit may be presented on the electronic device. A timer or time tracker may be initialized on the vehicle 100 or the mobile device 102 based on the parking time limit associated with the recognized location.

The time tracking may begin in response to a determination that the vehicle 100 has been parked (e.g., in response to indication that the vehicle has been locked or that the user has left the vehicle, etc.). In one embodiment, it can determine that the user has left the vehicle if the user's mobile device is determined to be at a different location as the vehicle. The user of the vehicle 100 may be periodically notified of the time remaining until the vehicle must be moved from the parking spot (and/or an elapsed time since the user parked in the spot, especially if no time limit information is available). For example, the user may receive notifications on the mobile device 102 (e.g., graphical notifications, text notifications, SMS messages, etc.). The user may also receive an estimated amount of time that would be required to return to the car from his current location. This estimated amount of time can be determined based on the distance between the location of the car and his current location and his (or an average person's) average foot speed, in the same or similar way that a map application determines an estimated time of travel between two points. This estimated amount of time can be displayed along with the time remaining at the parking space. In another embodiment, the mobile device can set a periodic reminder as soon as it detects that it is moving away from the parked vehicle.

In some embodiments, either or both of the vehicle 100 and the mobile device 102 are in communication with a parking meter 104 associated with a parking space occupied by the vehicle. For example, the parking meter 104 can provide the time limit information to the vehicle 100 and/or the mobile device 102 for time tracking purposes. Further, the vehicle 100 and/or the mobile device 102 can provide payment information to the parking meter 104 (or a central parking server keeping track of parking time of a number of meters) to pay for the parking. Any communication among the vehicle 100, the mobile device 102, and/or the parking meter 104 may be transmitted directly between these devices (e.g., via near field communication (NFC), Bluetooth, etc.) or over a network (e.g., a cellular network, the internet, etc.).

Figure 2:
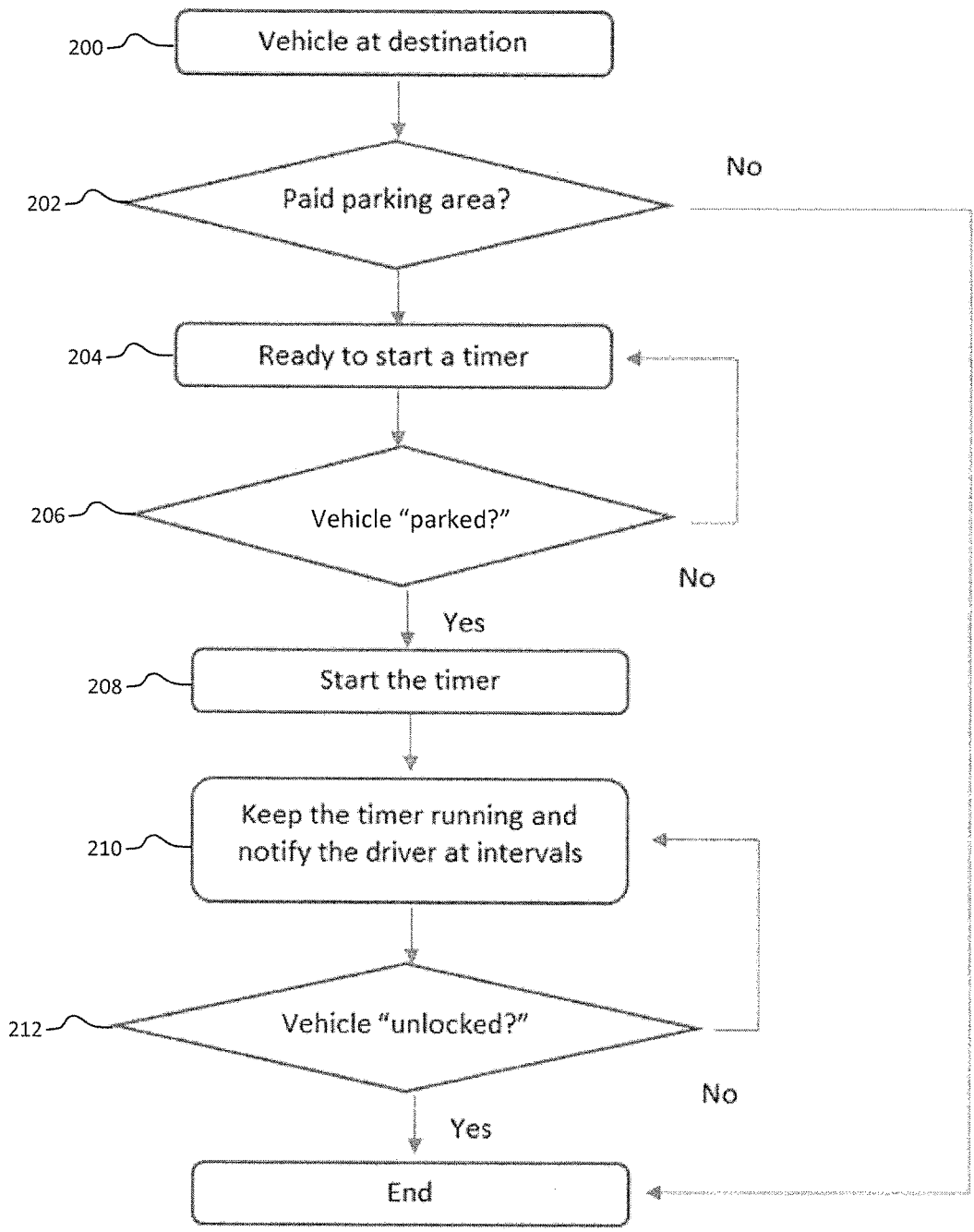
FIG. 2 illustrates an exemplary method of a location based parking meter time reminder according to embodiments of the disclosure.

FIG. 2 illustrates an exemplary method of a location based parking meter time reminder according to embodiments of the disclosure.

In some embodiments, an electronic device (e.g., a vehicle 100, a mobile device 102, etc.) can determine (200) that a vehicle is at its destination. For example, navigation software (local to the electronic device or remotely at another device) can provide an indication that the vehicle is at its destination. Then, the electronic device can determine (202) whether the vehicle is at a paid parking area. For example, the location of the electronic device can be compared to a digital map of paid parking areas to determine whether the vehicle is at a paid parking area. The digital map can be stored locally on the electronic device and updated periodically. If the vehicle is not at a paid parking area, no further action may be taken. If the vehicle is at a paid parking area, a timer may be initialized (204).

In some embodiments, the electronic device may simply determine (206) that the user has parked the vehicle (e.g., without necessarily determining whether a user is at a specific destination). For example, the electronic device may receive an indication (e.g., from the vehicle) that the vehicle has been locked, and determining that the vehicle has been parked may be based on the indication that the vehicle has been locked. Then, the timer may be started (208) if it is determined that the vehicle has been locked by the user.

In some embodiments, determining whether the user has parked the vehicle may be based on any number of factors, including whether the vehicle has been locked, whether the vehicle has been turned off, or based on the location of the vehicle (or another electronic device such as a mobile device or smartphone). For example, if it is determined (e.g., by the vehicle or the electronic device) that the electronic device has left the vehicle and/or the vehicle is in a parking area, it can be determined that the vehicle has been parked. Alternatively or additionally, the vehicle can be determined to have been parked based on the indication that there is no occupant in the vehicle. This can be determined by, for example, pressure sensors in the seats of the vehicle or one or more images captured by cameras inside the vehicle.

In some embodiments, it may be determined that the vehicle has been parked in response to an indication that a user has left the vehicle. For example, pressure sensors in the driver and/or passenger seat may indicate that a user has left the vehicle, or it can be detected that the user's key fob has left the vicinity (e.g., within a predefined distance) of the vehicle. In other embodiments, it may be determined that the vehicle has been parked if the vehicle is in the parking gear. In some embodiments, the vehicle can determine that is has been parked (e.g., in any of the manners described above), and can notify the electronic device as such, or can transmit any of the information above to the electronic device, which can determine that the vehicle has been parked based on the information received from the vehicle.

Although some embodiments describe starting a timer when it has been determined that the user has parked the vehicle, more generally, the electronic device may select a parking notification event (e.g., for presentation on a display of the electronic device) in response to determining that the vehicle has been parked. A parking notification event may include a reminder notification based on a parking time limit, as described above. In some embodiments, the parking notification event may simply include a notification of the elapsed time since parking. In some embodiments, a parking notification event may include a notification that the vehicle was parked illegally if, for example, the location of the electronic device or the vehicle indicates that the vehicle is parked in a no parking zone. In some embodiments, a parking notification event may include a notification that the streets will be cleaned at some set point in the future (e.g., "tomorrow at 10 am" or "Tuesday") and the vehicle must be moved before then. Each of the possible parking notification events may be selected based on the location of the electronic device and/or comparison of the location to a map that associates regions or locations with parking information (e.g., time limits, meter information, street cleaning information, no parking zones, etc.).

In some embodiments, a parking notification event may include a prompt to pay for parking. The prompt may be displayed on the electronic device, and, in response to user input, payment information (e.g., credit card information, etc.) may be sent to a parking meter to pay for the parking. The payment information can be any existing mechanism of making a payment using an electronic device. The payment information can be sent to a central server (not shown in FIG. 1) in communication with the parking meter. The central server can keep track of payment information associated with a number of parking meters in its database and update the status of each of the parking meters remotely based on the payment information.

In some embodiments, a parking time limit may be determined and the parking notification event may be selected based on the determined parking time limit (e.g., a timer may be set based on the parking time limit). For example, a location of the electronic device or the vehicle may be determined, and the parking time limit may be determined based on the location by comparing the location to a map that associates locations and/or regions with time limits. In some embodiments, the parking time limit may be determined based on a predetermined default time limit (e.g., if no time limit information is available for the current location).

In some embodiments, a meter time limit may be received (e.g., by the vehicle and/or the electronic device) from a nearby parking meter, and the meter time limit may be used as the time limit for the parking notification event. In this way, a parking meter can provide a more precise time remaining, even with live updates, so the user knows exactly when the parking meter will expire. In some embodiments, the corresponding parking location may be determined not based on proximity to a meter, but based on user input, such as text input of a parking space number, or visual input of the number, a barcode, or a QR code, etc. The input may be sent to a "meter" on central server that can identify the vehicle's parking location based on the input, and provide time limit information and/or accept payment information to pay for the parking. In some embodiments, a notification can be generated by the vehicle (e.g., in any of the manners described above), and transmitted by the vehicle to the electronic device for display on the electronic device.

In some embodiments, the electronic device may display, on its display, a user interface object indicating the selected parking notification event. For example, the electronic device may notify (210) the user of the remaining time (or an elapsed time) at predetermined intervals. In some embodiment, the reminder intervals can be configured via user input at the electronic device.

In some embodiments, the electronic device (or the vehicle) may determine the parking time limit has expired. In response to determining the parking time limit has expired, the electronic device can automatically send payment information to the parking meter (e.g., directly, or via the vehicle) to pay for additional parking. In some embodiments, a prompt may be displayed and the authorization to pay for additional parking may only be sent in response to user input paying for the additional parking.

The electronic device may determine (212) when the vehicle is unlocked (e.g., via an indication received from the vehicle), and the timer may be ended accordingly, after which no further notifications may be generated. In some embodiments, other information may be used to determine that the timer should be ended. For example, the timer may be ended in response to the vehicle being driven away.

Figure 3:
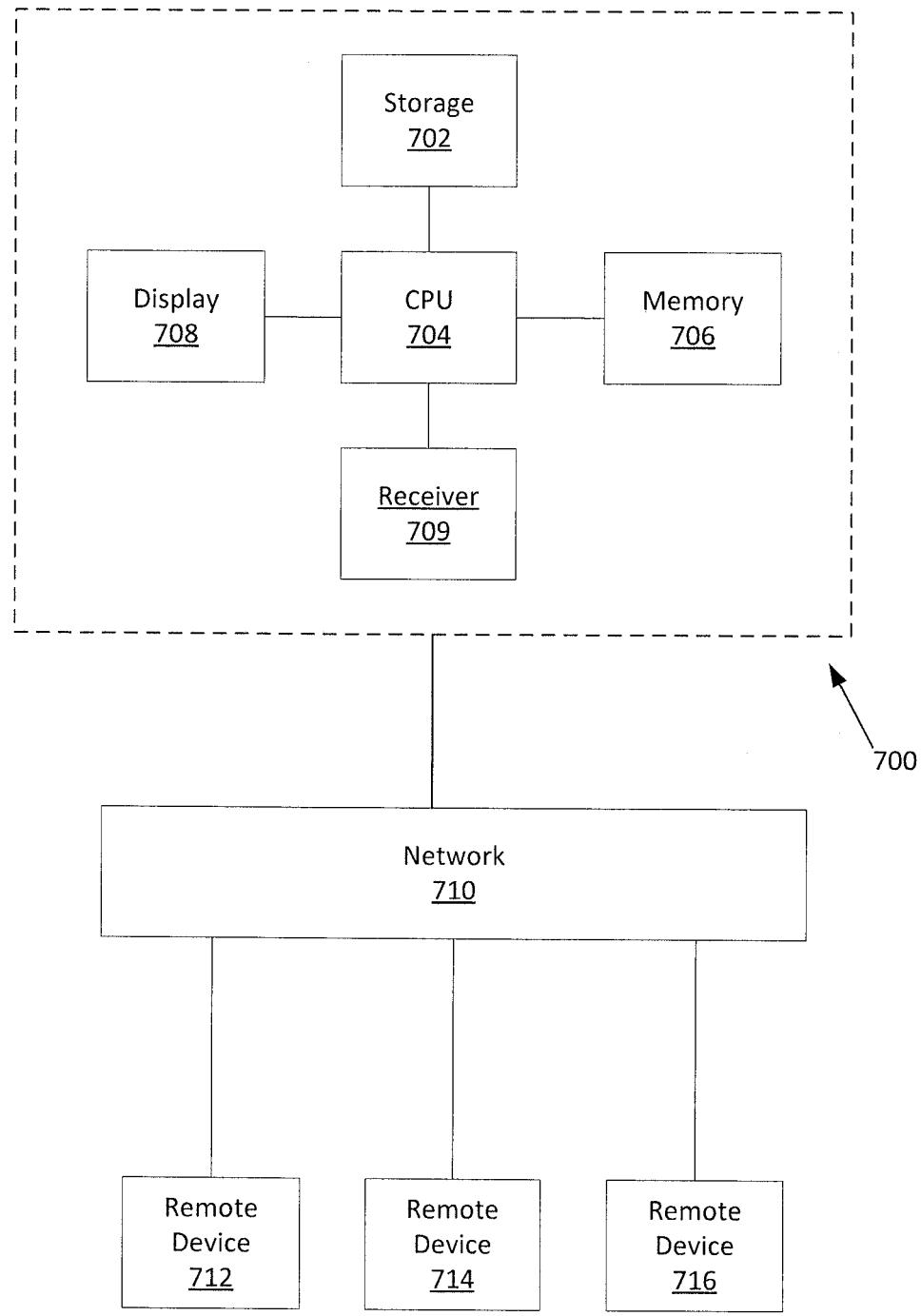
FIG. 3 illustrates an exemplary system for a location based parking meter time reminder according to embodiments of the disclosure.

FIG. 3 illustrates an exemplary system 700 for a location based parking meter time reminder according to embodiments of the disclosure. In one embodiment, the exemplary system 700 can be an electronic device such as a smartphone. The system 700 can include a CPU 704, storage 702, memory 706, display 708 and receiver 709. The CPU 704 can perform the methods illustrated in and described with reference to FIGS. 1 and 2. Additionally, the storage 702 can store data and instructions for performing the methods illustrated and described with reference to FIGS. 1 and 2. The storage 702 can be any non-transitory computer readable storage medium, such as a solid-state drive or a hard disk drive, among other possibilities. User interfaces, such as user interface objects and notifications described above, may be displayed on the display 708. The receiver 709 can receive information from a remote device (e.g., a vehicle, a parking meter, and/or a mobile device)

The system 700 can communicate with one or more remote devices 712, 714, and 716 (e.g., a vehicle, a parking meter, and/or a mobile device) over a wired or wireless network 710, such as a local area network, wide-area network, or internet, among other possibilities. The steps of the methods disclosed herein may be performed on a single system 700 or on several systems including the remote devices 712, 714, and 716. For example, a vehicle 100 may determine that the user has parked in a paid parking area and it may send an indication to a mobile device 102. In response, the mobile device 102 may begin a timer to keep track of the elapsed time and notify the user of the elapsed time at set intervals.

Therefore, according to the above, some examples of the disclosure are directed to a method performed on an electronic device in communication with a vehicle, the method comprising: receiving, from the vehicle, first information indicative of a state of the vehicle; receiving second information indicative of a parking time limit at a current parking location of the vehicle; determining that the vehicle has been parked based on the received first information; in response to determining that the vehicle has been parked: in accordance with a determination that the received second information indicates that the parking time limit expires at a respective time: selecting a parking notification event for presentation on the electronic device based on the received second information; and presenting, on the electronic device, the selected parking notification event at a time based on the respective time; and in accordance with a determination that the received second information indicates that no parking time limit exists at the current parking location of the vehicle, forgoing selecting the parking notification event for presentation on the electronic device. Additionally or alternatively to one or more of the examples disclosed above, in some examples, the received first information includes an indication that the vehicle has been locked, and determining that the vehicle has been parked is based on the indication that the vehicle has been locked. Additionally or alternatively to one or more of the examples disclosed above, in some examples, the received first information includes an indication that the vehicle has been turned off, and determining that the vehicle has been parked is based on the indication that the vehicle has been turned off. Additionally or alternatively to one or more of the examples disclosed above, in some examples, the received first information includes an indication that the vehicle has reached its destination set in navigation software on the vehicle, and determining that the vehicle has been parked is based on the indication that the vehicle has reached its destination. Additionally or alternatively to one or more of the examples disclosed above, in some examples, the received first information includes an indication that a user of the vehicle has left the vehicle, and determining that the vehicle has been parked is based on the indication that the user of the vehicle has left the vehicle. Additionally or alternatively to one or more of the examples disclosed above, in some examples, the received first information includes an indication that no key is detected within a predefined distance from the vehicle, and determining that the vehicle has been parked is based on the indication that no key is detected within the predefined distance from the vehicle. Additionally or alternatively to one or more of the examples disclosed above, in some examples, the received first information includes an indication that the vehicle is in a parking gear, and determining that the vehicle has been parked is based on the indication that the vehicle is in the parking gear. Additionally or alternatively to one or more of the examples disclosed above, in some examples, the received first information includes an indication that the vehicle has determined that it has been parked, and determining that the vehicle has been parked is based on the vehicle's determination. Additionally or alternatively to one or more of the examples disclosed above, in some examples, the received first information includes a location of the vehicle, and determining that the vehicle has been parked is based on a distance between a location of the electronic device and the location of the vehicle. Additionally or alternatively to one or more of the examples disclosed above, in some examples, the second information indicative of the parking time limit is based on a meter time limit received from the vehicle or a parking meter, and the parking time limit is determined based on the received meter time limit. Additionally or alternatively to one or more of the examples disclosed above, in some examples, the selected parking notification event on the electronic device includes displaying, on a display of the electronic device, a user interface object including a graphical display of an estimated time for a user to travel from a current location of the electronic device to the current parking location of the vehicle. Additionally or alternatively to one or more of the examples disclosed above, in some examples, the selected parking notification event on the electronic device includes displaying, on a display of the electronic device, a prompt to pay for parking, the method further comprising: after displaying the prompt on the display, receiving user input paying for parking; and sending payment information to a parking meter based on the user input. Additionally or alternatively to one or more of the examples disclosed above, in some examples, the method further comprises: determining that the parking time limit has expired; and in response to determining that the parking time limit has expired, automatically sending payment information to a parking meter to pay for additional parking. Additionally or alternatively to one or more of the examples disclosed above, in some examples, presenting the selected parking notification event on the electronic device includes displaying, on a display of the electronic device, a user interface object, the user interface object includes a graphical display of a remaining time in the parking time limit, and the method further comprises: in accordance with the determination that the received second information indicates that no parking time limit exists at the current parking location of the vehicle, selecting a second parking notification event for presentation on the display of the electronic device that includes an elapsed time since the determination that the vehicle was parked. Additionally or alternatively to one or more of the examples disclosed above, in some examples, the method further comprises: after selecting the parking notification event for presentation on the electronic device, and before presenting the selected parking notification event on the electronic device: determining that the vehicle has been unlocked; and in response to determining that the vehicle has been unlocked, forgoing presenting the selected parking notification event on the electronic device.

Some examples of the disclosure are directed to an electronic device comprising: one or more processors; a receiver configured to receive information from a remote device; a display; and a memory; wherein the one or more processors are configured to perform a method, the method comprising: receiving, via the receiver, first information from a vehicle indicative of a state of the vehicle; receiving, via the receiver, second information indicative of a parking time limit at a current parking location of the vehicle; determining that the vehicle has been parked based on the received first information; in response to determining that the vehicle has been parked: in accordance with a determination that the received second information indicates that the parking time limit expires at a respective time: selecting a parking notification event for presentation on the electronic device based on the received second information; and presenting, on the electronic device, the selected parking notification event at a time based on the respective time; and in accordance with a determination that the received second information indicates that no parking time limit exists at the current parking location of the vehicle, forgoing selecting the parking notification event for presentation on the electronic device. Additionally or alternatively to one or more of the examples disclosed above, in some examples, the received first information includes an indication that the vehicle has been locked, and determining that the vehicle has been parked is based on the indication that the vehicle has been locked. Additionally or alternatively to one or more of the examples disclosed above, in some examples, the received first information includes an indication that the vehicle has been turned off, and determining that the vehicle has been parked is based on the indication that the vehicle has been turned off. Additionally or alternatively to one or more of the examples disclosed above, in some examples, the received first information includes an indication that the vehicle is in a parking gear, and determining that the vehicle has been parked is based on the indication that the vehicle is in the parking gear. Additionally or alternatively to one or more of the examples disclosed above, in some examples, the received first information includes a location of the vehicle, and determining that the vehicle has been parked is based on a distance between a location of the electronic device and the location of the vehicle. Additionally or alternatively to one or more of the examples disclosed above, in some examples, presenting the selected parking notification event on the electronic device includes displaying, on the display of the electronic device, a user interface object including a graphical display of an estimated time for a user to travel from a current location of the electronic device to the current parking location of the vehicle. Additionally or alternatively to one or more of the examples disclosed above, in some examples, presenting the selected parking notification event on the electronic device includes displaying, on the display of the electronic device, a user interface object, the user interface object includes a graphical display of a remaining time in the parking time limit, and the method further comprises: in accordance with the determination that the received second information indicates that no parking time limit exists at the current parking location of the vehicle, selecting a second parking notification event for presentation on the display of the electronic device that includes an elapsed time since the determination that the vehicle was parked. Additionally or alternatively to one or more of the examples disclosed above, in some examples, the method further comprises: after selecting the parking notification event for presentation on the electronic device, and before presenting the selected parking notification event on the electronic device: determining that the vehicle has been unlocked; and in response to determining that the vehicle has been unlocked, forgoing presenting the selected parking notification event on the electronic device.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A method performed on an electronic device in communication with a vehicle, the method comprising:
   receiving, from the vehicle, first information indicative of a state of the vehicle;

receiving second information indicative of a parking time limit at a current parking location of the vehicle;

determining that the vehicle has been parked based on the received first information;

in response to determining that the vehicle has been parked:

in accordance with a determination that the received second information indicates that the parking time limit expires at a respective time:

selecting a parking notification event for presentation on the electronic device based on the received second information; and presenting, on the electronic device, the selected parking notification event at a time based on the respective time; and in accordance with a determination that the received second information indicates that no parking time limit exists at the current parking location of the vehicle, forgoing selecting the parking notification event for presentation on the electronic device;

wherein the second information indicative of the parking time limit is based on a meter time limit received from the vehicle or a parking meter, and the parking time limit is determined based on the received meter time limit.

2. The method of claim 1, wherein the received first information includes an indication that the vehicle has been locked, and determining that the vehicle has been parked is based on the indication that the vehicle has been locked.

3. The method of claim 1, wherein the received first information includes an indication that the vehicle has been turned off, and determining that the vehicle has been parked is based on the indication that the vehicle has been turned off.

4. The method of claim 1, wherein the received first information includes an indication that the vehicle has reached its destination set in navigation software on the vehicle, and determining that the vehicle has been parked is based on the indication that the vehicle has reached its destination.

5. The method of claim 1, wherein the received first information includes an indication that a user of the vehicle has left the vehicle, and determining that the vehicle has been parked is based on the indication that the user of the vehicle has left the vehicle.

6. The method of claim 1, wherein the received first information includes an indication that no key is detected within a predefined distance from the vehicle, and determining that the vehicle has been parked is based on the indication that no key is detected within the predefined distance from the vehicle.

7. The method of claim 1, wherein the received first information includes an indication that the vehicle is in a parking gear, and determining that the vehicle has been parked is based on the indication that the vehicle is in the parking gear.

8. The method of claim 1, wherein the received first information includes an indication that the vehicle has determined that it has been parked, and determining that the vehicle has been parked is based on the vehicle's determination.

9. The method of claim 1, wherein the received first information includes a location of the vehicle, and determining that the vehicle has been parked is based on a distance between a location of the electronic device and the location of the vehicle.

10. The method of claim 1, wherein presenting the selected parking notification event on the electronic device includes displaying, on a display of the electronic device, a user interface object including a graphical display of an estimated time for a user to travel from a current location of the electronic device to the current parking location of the vehicle.

11. The method of claim 1, wherein presenting the selected parking notification event on the electronic device includes displaying, on a display of the electronic device, a prompt to pay for parking, the method further comprising:

after displaying the prompt on the display, receiving user input paying for parking; and sending payment information to a parking meter based on the user input.

12. The method of claim 1, the method further comprising:

determining that the parking time limit has expired; and in response to determining that the parking time limit has expired, automatically sending payment information to a parking meter to pay for additional parking.

13. The method of claim 1, wherein:

presenting the selected parking notification event on the electronic device includes displaying, on a display of the electronic device, a user interface object, the user interface object includes a graphical display of a remaining time in the parking time limit, and the method further comprises:

in accordance with the determination that the received second information indicates that no parking time limit exists at the current parking location of the vehicle, selecting a second parking notification event for presentation on the display of the electronic device that includes an elapsed time since the determination that the vehicle was parked.

14. The method of claim 1, further comprising:

after selecting the parking notification event for presentation on the electronic device, and before presenting the selected parking notification event on the electronic device:

determining that the vehicle has been unlocked; and in response to determining that the vehicle has been unlocked, forgoing presenting the selected parking notification event on the electronic device.

15. An electronic device comprising: one or more processors;

a receiver configured to receive information from a remote device; a display; and a memory;

wherein the one or more processors are configured to perform a method, the method comprising:

receiving, via the receiver, first information from a vehicle indicative of a state of the vehicle;

receiving, via the receiver, second information indicative of a parking time limit at a current parking location of the vehicle;

determining that the vehicle has been parked based on the received first information;

in response to determining that the vehicle has been parked:

in accordance with a determination that the received second information indicates that the parking time limit expires at a respective time:

selecting a parking notification event for presentation on the electronic device based on the received second information; and presenting, on the electronic device, the selected parking notification event at a time based on the respective time; and in accordance with a determination that the received second information indicates that no parking time limit exists at the current parking location of the vehicle, forgoing selecting the parking notification event for presentation on the electronic device;

wherein the second information indicative of the parking time limit is based on a meter time limit received from the vehicle or a parking meter, and the parking time limit is determined based on the received meter time limit.

16. The electronic device of claim 15, wherein the received first information includes an indication that the vehicle has been locked, and determining that the vehicle has been parked is based on the indication that the vehicle has been locked.

17. The electronic device of claim 15, wherein the received first information includes an indication that the vehicle has been turned off, and determining that the vehicle has been parked is based on the indication that the vehicle has been turned off.

18. The electronic device of claim 15, wherein the received first information includes an indication that the vehicle is in a parking gear, and determining that the vehicle has been parked is based on the indication that the vehicle is in the parking gear.

19. The electronic device of claim 15, wherein the received first information includes a location of the vehicle, and determining that the vehicle has been parked is based on a distance between a location of the electronic device and the location of the vehicle.

20. The electronic device of claim 15, wherein presenting the selected parking notification event on the electronic device includes displaying, on the display of the electronic device, a user interface object including a graphical display of an estimated time for a user to travel from a current location of the electronic device to the current parking location of the vehicle.

21. The electronic device of claim 15, wherein:
presenting the selected parking notification event on the electronic device includes displaying, on the display of the electronic device, a user interface object,
the user interface object includes a graphical display of a remaining time in the parking time limit, and the method further comprises:
in accordance with the determination that the received second information indicates that no parking time limit exists at the current parking location of the vehicle, selecting a second parking notification event for presentation on the display of the electronic device that includes an elapsed time since the determination that the vehicle was parked.

22. The electronic device of claim 15, wherein the method further comprises:
after selecting the parking notification event for presentation on the electronic device, and before presenting the selected parking notification event on the electronic device:
determining that the vehicle has been unlocked; and
in response to determining that the vehicle has been unlocked, forgoing presenting the selected parking notification event on the electronic device.

\* \* \* \* \*